Oct. 28, 1969   W. A. ANDERSON ET AL   3,475,680
IMPULSE RESONANCE SPECTROMETER INCLUDING A TIME
AVERAGING COMPUTER AND FOURIER ANALYZER
Filed May 26, 1965   2 Sheets-Sheet 1
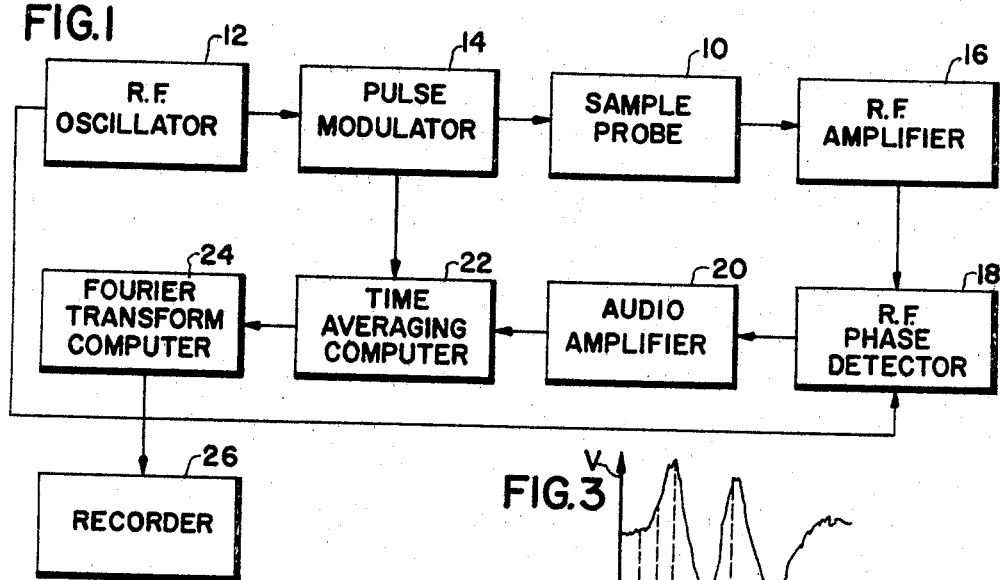
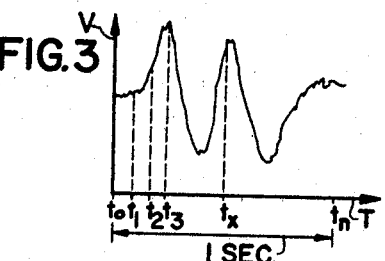
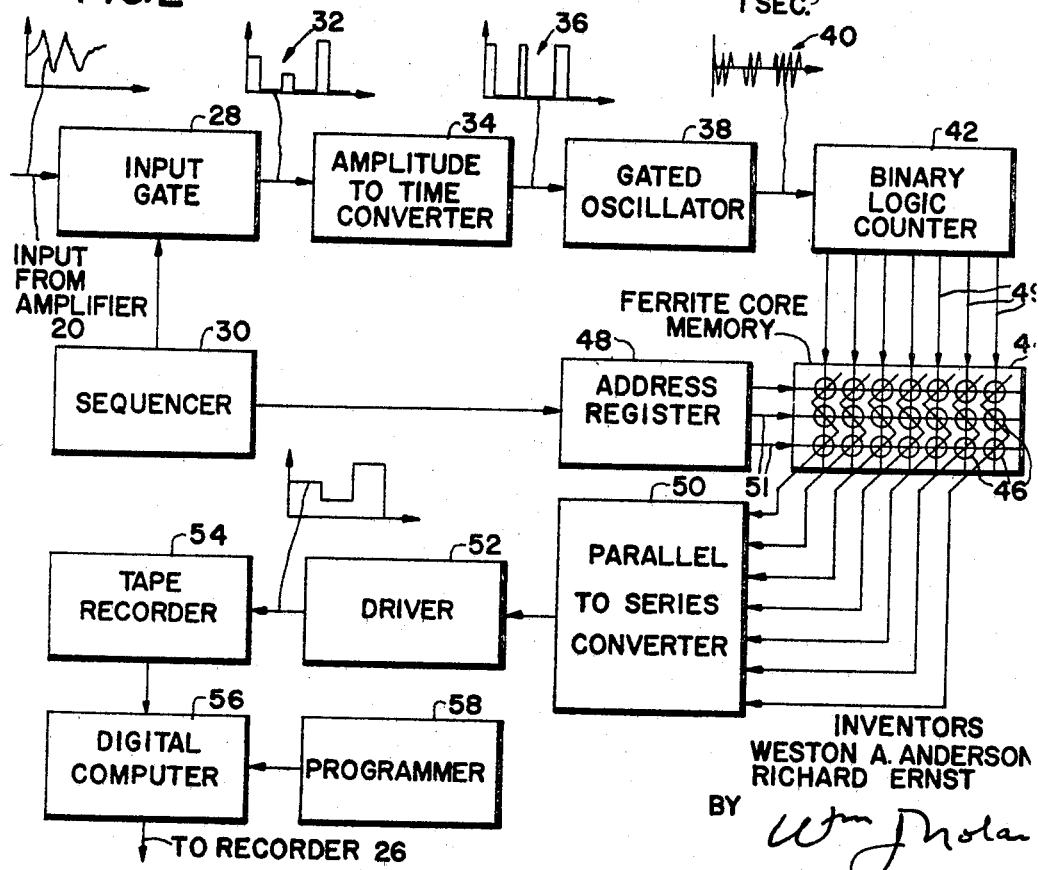
INVENTORS
WESTON A. ANDERSON
RICHARD ERNST
BY
ATTORNEY

United States Patent Office 3,475,680
Patented Oct. 28, 1969

3,475,680
IMPULSE RESONANCE SPECTROMETER INCLUDING A TIME AVERAGING COMPUTER AND FOURIER ANALYZER
Weston A. Anderson and Richard Ernst, Palo Alto, Calif., assignors to Varian Associates, Palo Alto, Calif., a corporation of California
Filed May 26, 1965, Ser. No. 459,006
Int. Cl. G01r 33/08; G01n 27/02
U.S. Cl. 324—.5
15 Claims

ABSTRACT OF THE DISCLOSURE

A resonance spectrometer is disclosed. The spectrometer includes a probe for containing a sample of matter to be analyzed, such sample being capable of having a plurality of different resonant groups. A radio frequency transmitter is provided for applying coherent oscillations to the sample. A pulse modulator is provided for modulating the coherent oscillations as applied to the sample for simultaneously exciting resonance of different resonant groups, if any, at different resonant frequencies to produce a coherent resonance signal. The composite resonance signal, which is of a transient character, is detected in a receiver and fed to a time averaging computer which samples each transient resonance signal at certain predetermined time displaced intervals and stores the sampled signals in respective channels thereof. The stored information is subsequently read out and Fourier analyzed for separating the different resonance components at the different resonant frequencies. The output of the Fourier analyzer is recorded for obtaining a recorded spectrum of the sample under analysis.

---

The present invention is particularly applicable to resonance spectroscopies with a coherent radiation source, such as nuclear magnetic resonance (NMR), electron spin resonance, quadrupole resonance, ultrasonic resonance, optical laser spectroscopy, microwave spectroscopy and the like. However, for the purpose of explanation, the invention will be described with reference to NMR spectroscopy.

NMR spectroscopy is based on a method of detecting the magnetic moments or precession frequencies of the nuclei of a sample material which is subjected to the forces of an external polarizing magnetic field and an alternating magnetic field. The detected magnetic changes of the nuclei are represented as spectra on a graphic recorder or oscilloscope. Precession of the magnetic moments of the nuclei around the magnetic axis establishes the resonant frequencies of the sample or isotope under investigation and thereby provide a manner of positive identification.

Difficulties in the interpretation of all of the structure of NMR spectra arise as a result of the poor signal-to-noise ratio. It would be desirable to improve the strength of the detected spectrum signal and to be able to analyze a recorded spectrum expeditiously.

An object of this invention is to provide a novel signal processing system that enables improved analysis of resonance signals.

Another object of this invention is to provide an NMR spectrometer apparatus which affords an enhanced spectral signal output for readout.

Another object is to provide a novel and improved means for storing and analyzing a signal waveform, such as a gyromagnetic resonance signal or resonance spectrum.

According to this invention, an input signal that is to be modulated, by a resonance characteristic of the sample for example, is pulsed to develop sidebands or a wideband signal. Components of the modulated output signal, which contains the resonance information of the sample, are stored sequentially in respective channels of a signal storage system. Repeated output signals are derived and added coherently in the signal storage system. A readout circuit may convert the stored data to a continuous waveform that is representative of the modulation, which is related to the resonance spectrum of the sample.

In a particular embodiment of this invention, a resonance apparatus includes a probe containing a sample under study, which is excited to resonance by a signal from a coherent frequency source. The frequency signal is pulse modulated so that sidebands of the resonance signal are generated, effectively providing a wideband signal. These generated sidebands effectively cover the entire part of the spectrum that is being investigated. After each modulation pulse, successive resonance signals are developed, each being substantially the same. These resonance signals are demodulated synchronously with the unmodulated frequency, and the demodulated signals are stored sequentially after each pulse in a time averaging computer, which may be a magnetic core memory system by way of example. The computer comprises a multiplicity or series of channels or addresses, wherein each channel or address receives in sequence a discrete component of each successive resonance signal which is the impulse response of the sample under investigation. Each component is fed to a given channel or address having the same time reference relative to the modulation pulse or the beginning of each scan. The signal components of each succeeding scan are added to the previously stored components in the computer or storage device. The desired spectrum is then computed from the stored signal components in each channel by Fourier transformation or Fourier series expansion of the impulse response to a transfer function or frequency response of the sample. This spectrum may be registered on a graphic recorder or other readout device. The spectrum, obtained from the impulse response, or the impulse response itself can be used to characterize the sample.

In another embodiment of the invention, a resonance apparatus comprises an oscillator for providing a first frequency that serves to excite a sample to resonance. A second reference frequency is applied to the sample, which contains a reference material, in addition to the unknown sample that is being analyzed. The reference is utilized to detect changes in the magnetic field applied to the sample probe, and any such changes result in an error D.C. voltage. This voltage is then used to adjust the phase for the dispersion mode signal, thereby maintaining a constant field-frequency relationship.

The invention will be described in greater detail with reference to the drawing wherein:

FIGURE 1 is a block diagram of the inventive resonance apparatus and associated signal processing system;

FIGURE 2 is a schematic and block diagram illustrating one form of the time averaging computer used in FIGURE 1;

FIGURE 3 is a representation of a spectrum to aid in the explanation of the invention.

Similar numerals refer to similar elements throughout the drawing.

Figure 4:
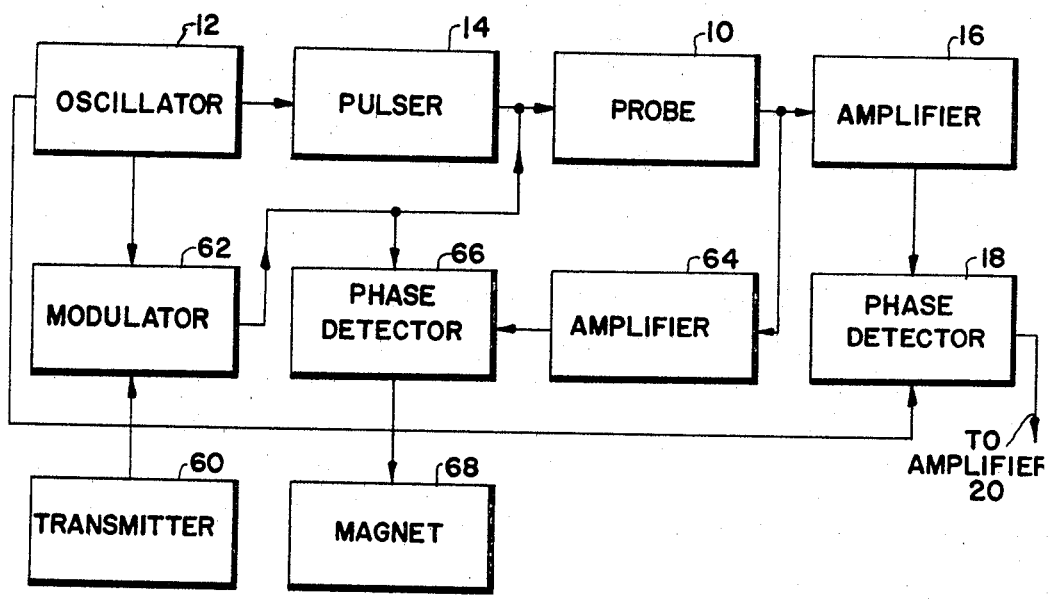
FIGURE 4 is a block diagram of an alternative embodiment of the inventive system.

In FIGURE 1, a sample contained in a probe assembly 10 is excited by a radio frequency signal from an oscillator 12, which is pulse modulated by a modulator 14. The exciting signal may have a frequency of 60 megacycles per second (mc./sec.), and the modulating pulse may be 100 microseconds in length and have a repetition rate of one cycle per second. The periodic pulses serve to amplitude modulate the 60 mc. radiation applied to the sample, so that sidebands are generated which cover the spectrum portion of interest. The output signal that is sensed at the probe assembly 10 constitutes the carrier of 60 mc./sec. plus sidebands resulting from the pulsing of the RF source, such signals being modulated by the resonances of the sample under investigation. The output signal from the sample is received by an RF amplifier 16, and the amplified signal is then directed to a phase detector 18, which simultaneously receives the unmodulated carrier from the RF oscillator 12. The signals are compared in the phase detector 18, which converts the 60 mc. RF carrier in the correct phase to a D.C. voltage, and converts other sidebands signal frequencies to audio frequency signals representing the resonance signal of the sample. These D.C. and low frequency signals are amplified in an audio amplifier 20, and then fed to and stored in a time averaging computer 22, to be described in greater detail with reference to FIGURE 2.

A transient resonance signal is derived repeatedly after each pulse signal from the modulator 14, and time displaced components of each of the transient resonance signals are stored in memory channels of the computer 22 that have the same time value $t_n$ relative to the beginning time $t_o$ of each scan, i.e., each time displaced transient resonance signal (see FIG. 3). Each scan of sampling times occupies about a one second interval, and equally spaced successive bits of the derived signal are sensed every millisecond, so that approximately 1000 signal components are detected and recorded in 100 respective channels for every scan. The scan may be internally synchronized from the start of each received transient resonance signal or by a signal derived from the pulse modulator 14 and fed to a sequencer 30 in the time averaging computer 22. The scan may be repeated 500 times, by way of example. With high resolution NMR apparatus, such as Varian Associates Model A-60A, the resonance signal obtained for each repeated scan for the same sample is substantially the same. Therefore, for each scan, each storage channel sees a substantially similar data bit as for any other scan, if random noise or other spurious signals do not appear. It is known that with repetitive scanning, signal information may be added directly and noise is added as the square root of the number of scans because of its incoherence. By adding the signal in a time averaging computer, as provided with this invention, the intelligence signal is reinforced, while noise is minimized, thereby substantially enhancing the signal-to-noise ratio. Coherent noise not synchronous with the scanning rate as well as incoherent noise may be averaged and reduced.

The stored data is transformed by Fourier analysis in a computer apparatus 24, from a weighting function or impulse response characteristic, represented as a multiplicity of numbers stored in binary form in a multiplicity of channels of the time averaging computer 22, to a transfer function or frequency response characteristic of the spin system being investigated. This transformation to transfer function format affords recordation of a spectrum in graphic or visible form on a recorder 26, as is well known in the art.

Instead of sweeping the field or frequency and looking only at one point of the spectrum as accomplished in prior art systems, by looking at a wideband spectrum simultaneously, the information rate is greatly increased with the presently disclosed pulsing method. In effect, a multi-channel spectrometer is provided which affords derivation of spectra in a relatively short time, without need for linear sweeps.

FIGURE 2 depicts one arrangement of a time averaging computer and transform computer, such as are employed in blocks 22 and 24 of the apparatus of FIGURE 1. In operation, the varying audio frequency signal that is representative of the resonance, and which is to be registered on the recorder 26, is channeled from the audio amplifier 20 to an input gate 28. A sequencer 30 periodically opens the gate 28, say every millisecond for an interval of say 100 microseconds, to pass a pulse component 32 or one discrete bit of the one second spectral scan. This data bit representing approximately 1/1000 of the total spectrum is directed to an amplitude-to-time converter 34, which converts the data pulse 32 to a second pulse 36 of constant amplitude but having a width proportional to the amplitude of the pulse component 32. The time coded pulse 36 energizes a gated oscillator 38, which produces an alternating wave or oscillatory burst 40 having an integral number of cycles relating to the width of the coded pulse 36. This burst signal 40 is directed to a logic counter 42, which produces a binary output for application to a core memory system 44.

By way of example, in one embodiment of this invention, the core memory system 44 comprises a matrix of 1000 horizontal rows (only 3 being shown) of ferrite cores 46, each row representing a signal address or channel. Each horizontal row has seventeen cores (only 7 being shown), a single row of cores being activated simultaneously by an address register 48 which is controlled by the sequencer 30. The seventeen cores in each row are aligned so as to form seventeen vertical columns of 1000 cores each. The cores are coupled to the logic counter 42 by column drive leads 49, and to the address register 48 by row drive leads 51. The horizontal rows are energized successively every millisecond concomitantly with the opening of the gate 28. For each spectral scan lasting one second, the register 48 energizes all of the 1000 horizontal rows in seriatim, repeating the process for every one second scan.

Each horizontal row of seventeen cores has $2^{17}$ possible levels or amplitudes that may be recorded for any discrete component of the sensed resonance signal, say at time $t_x$ of any scan. Thus, the vertical resolution of the storage system is one part in $2^{17}$.

For example, if the oscillatory burst 40 consists of one cycle, then the first core in the activated horizontal row would become magnetized clockwise, the other sixteen cores being magnetized counterclockwise; if two cycles are to be registered, then the second core would be magnetized clockwise, and the others counterclockwise; if three cycles are to be recorded, then the first and second cores of the energized row would be magnetized clockwise, and the others counterclockwise; and so on, up to $2^{17}$ possible combinations. A description of a digital memory, such as may be employed with the inventive apparatus, is found in "Analog and Digital Computer Technology," a textbook by N. R. Scott published by McGraw-Hill, 1960, particularly pages 445-449.

In operation, each successive one second scan provides an impulse response of approximately 1000 discrete components to be registered in the memory storage device 44. The data number representing any one component being fed from the logic counter 42 to an activated horizontal row of cores is added to the previously stored data number total. If the total number that is registered in a horizontal row reaches saturation at $2^{17}$ (131,072), then there is a rollover to zero, and the recycled count commences in a manner known in the computer art.

At the end of a predetermined number of scans, for example 500 scans, a readout may be initiated by use of a parallel-to-series converter 50. The converter 50 reads out the seventeen bits of each row simultaneously, grouping the bits into a series of 6-6-5 respectively. The grouped bit signals for each horizontal row are amplified by a driver 52, and each group is serially stored in alignment along the width of a magnetic tape of a tape recorder 54. The tape has six longitudinal recording tracks or information channels and a seventh track for parity check. The magnetically recorded series of bits from the 1000 core storage channels are fed to a digital computer 56, which receives a format from a programmer 58 to accomplish a Fourier series expansion in 500 Fourier components. These Fourier components represent discrete values of the spectrum corresponding to the 1000 number sequentially stored in the horizontal rows of the memory device 44. This waveform is reproduced in a continuous manner on the recorder 26 for visual observation and interpretation.

In FIGURE 4, a proton resonance spectrometer includes an oscillator 12 that provides an exciting signal or coherent frequency to a sample probe 10 through a pulse modulator 14. A resonance signal, which may be the absorption mode signal, is detected and passed through an amplifier 16 to a phase detector 18, where the signal is compared to the exciting signal from the oscillator 12, and processed further as described with reference to FIGURE 1.

In this embodiment, a transmitter 60 generates a 3.6 megacycles/second signal that is mixed with the 60 mc. signal from the oscillator 12 in a modulator 62, to provide a 56.4 mc. sideband output. This output is suitable for fluorine resonance, and is applied to the sample probe 10, which contains a fluorine compound, such as hexafluorobenzene in addition to the unknown sample. The fluorine resonance signal, which may be the dispersion mode signal, that is obtained from the probe 10 is passed through an amplifier 64 to a phase detector 66, which also receives the 56.4 mc. reference signal from the modulator 62. Any phase difference produces an error signal or D.C. voltage that serves to vary current and to stabilize the unidirectional field of the magnet 68 that surrounds the sample probe 10, as is well known. In this manner, the magnetic field intensity is adjusted relative to the frequency of the detected dispersion mode, and in turn, the field applied to the unknown sample is adjusted for the absorption mode, so that a constant field-frequency relationship is established.

A method of programming a Fourier analysis is described in "Mathematical Methods for Digital Computers," a textbook authored by Ralston and Wilf, published by Wiley and Sons, 1962, see page 258.

Assuming a total number of numerical values N (in this embodiment, N equals 1000 channels), the characteristic of the desired spectrum for the absorption mode is given as:

(1) $$A_h = \sum_{k=1}^{N} f_k \cdot \cos 2\pi T \frac{hk}{N}$$

where $f_k$ are the N numerical values and where T is the length of one impulse response (one second in this instance), $k$ is a variable integer (from 1–1000, corresponding to the number of channels), and $A_h$ is one of the N/2 amplitude values of the spectrum.

For the dispersion mode, the spectrum is delineated by (2) $$D_h = \sum_{k=1}^{N} f_k \cdot \sin 2\pi T \frac{hk}{N}$$

Other descriptions of the relation of impulse response to transfer function may be found in "Random Processes in Automatic Control," by Laning and Battin, McGraw-Hill, 1956, page 182; and "An Introduction to Statistical Communication Theory" by Middleton, McGraw-Hill, 1960.

There has been described herein a resonance apparatus wherein a coherent oscillation that is applied to a sample to be analyzed in an NMR spectrometer, is pulsed repetitively for generating sideband frequencies. Such sideband signals are applied simultaneously with the original oscillation to the unknown sample. The resultant spectral signal, which contains a multiplicity of components developed by the oscillation and its sidebands, is sampled after each pulse at equally spaced intervals to obtain discrete bits of information. These bits are stored in respective memory units or channels of a time averaging computer successively and repeatedly. Each information bit is time referenced to the pulse interval, and all bits having the same reference time value are added in a common memory unit. In this manner, the useful information signal is strengthened and random noise is effectively attenuated. The resultant signal is then interpreted by Fourier analysis, whereby components of the signal waveform are analyzed simultaneously, and related to resonance characteristics of the sample.

The pulsing technique utilized with the present invention affords several advantages. For example, spectra may be obtained in a much shorter time than with the conventional sweep system. Since the entire system is simultaneously excited, the information content is increased. Also, sensitivity is greatly enhanced. Furthermore, the presently disclosed apparatus allows investigation of non-linear effects. The system provides a simplified, accurate calibration of a spectrum having an accurate time measurement.

It should be understood that the invention is not limited to the particular configurations, parameters, or values specified above. The length of the scans, the number of scans, the frequencies utilized, inter alia, may be varied for different experiments. Also, different types of computers may be used, and other storage devices may be employed within the scope of the present invention.

What is claimed is:

1. In a resonance spectrometer including, a probe for containing a sample to be analyzed such sample being capable of having a plurality of different resonant groups, means for applying coherent oscillations to such sample, means for pulse modulating such cohent oscillations as applied to such sample for simultaneously exciting resonance of different resonant groups, if any, at different resonance frequencies to produce a composite signal, means for detecting the composite resonance signal of the excited sample, means for storing discrete time displaced components of the composite resonance signal in a time averaging computer, means for transforming the stored signal by Fourier analysis for separating the different resonance components, if any, at different frequencies, and means for recording such transformed signal to obtain a recorded spectrum of the sample.

2. A resonance spectrometer as in claim 1, wherein said detecting means comprises a phase detector coupled to the coherent oscillation applying means for comparing the detected resonance signal with the unmodulated oscillation, whereby an audio difference signal is developed.

3. A resonance apparatus as in claim 1, wherein said storing means is a matrix core memory having horizontal rows of cores, each row serving as an information channel for storing binary information.

4. A resonance apparatus as in claim 3, further including an address register for activating the horizontal rows of cores sequentially.

5. A resonance apparatus as in claim 4, wherein a binary logic counter provides data representative of components of the resonance signal to each row when activated.

6. A resonance apparatus as in claim 5, wherein a sequencer controls said address register, and simultaneously controls the signal input to the logic counter.

7. A resonance apparatus as in claim 3, further including a parallel-to-series converter for grouping bits of channel information in a series format for further processing.

8. In a resonance apparatus, a resonance sample to be analyzed containing a plurality of different resonance spectral lines, means for applying a coherent radio frequency oscillation to such sample at a frequency near the resonance frequency of the resonance spectral lines, means for modulating such radio frequency oscillation as applied to such sample with periodic pulses at a sufficiently low repetition frequency to produce sideband radio frequency energy of a sufficient bandwidth to cover the spectral lines of the sample to be analyzed for simultaneously exciting resonance of the different resonant spectral lines at different resonant frequencies to produce a transient composite resonance signal near the frequency of the applied radio frequency energy after each of the periodic radio frequency pulses, means for detecting the transient composite resonance signal after each of said applied radio frequency pulses, means for storing a multiplicity of equally spaced successive time displaced components of each of the transient composite resonance signals in a multiplicity of respective successive channels after each of said applied radio frequency pulses, and means for reading out the signal components stored in such channels.

9. In a resonance apparatus, a probe containing a sample to be analyzed capable of having a plurality of different spectral resonance lines, an oscillator for supplying a coherent radio frequency oscillation to the sample, a pulsed modulator coupled between said oscillator and probe for pulsing the radio frequency oscillation as applied to the sample at a predetermined sufficiently low frequency to produce sideband radio frequency energy of a sufficient bandwidth to cover the spectral lines of the sample to be analyzed for simultaneously exciting resonance of the different spectral resonant lines, if any, within the sample at different resonance frequencies to produce a transient composite resonance signal after each of the pulses of applied radio frequency energy, said probe having an output circuit, a phase detector coupled to the output circuit of said probe, means for coupling said oscillator to said phase detector to supply thereto coherent radio frequency oscillation for comparison of the frequency of such oscillation with the transient composite output signals at a frequency near the frequency of the applied radio frequency oscillation as received from said probe after each of the applied pulses of radio frequency oscillations to provide a low audio frequency transient composite resonance signal after each of the applied pulses of radio frequency oscillation, means for storing a multiplicity of separate time displaced components of each of such transient audio frequency composite resonance signals in a multiplicity of channels after each of the applied pulses of radio frequency oscillations, means for transforming such stored components to an analog signal, and means coupled to said transforming means for utilizing such analog signal.

10. In a gyromagnetic resonance apparatus, a sample probe for containing a sample to be analyzed which is capable of having a plurality of different gyromagnetic resonance groups, means for applying coherent oscillations to said probe and sample, means for modulating the oscillation energy applying means with periodic pulses for simultaneously exciting resonance of different gyromagnetic resonance groups, if any, at different resonance frequency to produce a composite resonance signal, means for deriving a composite resonance signal from said sample probe for each pulse, a memory device having a multiplicity of storage channels coupled to said sample probe, means for storing successive time displaced components of each composite resonance signal serially in successive channels of said memory device, each channel having an established time reference relative to said periodic pulses, means for transforming said stored resonance signal components by Fourier analysis from impulse response to transfer function form, and means for recording said transformed resonance signals.

11. In a resonance apparatus, a probe containing an unknown sample and a reference sample positioned in a unidirectional magnetic field, means for applying a first radio frequency signal to said probe, means for modulating said first radio frequency signal with periodic pulses at a sufficiently low frequency to produce sideband radio frequency energy of a sufficient bandwidth to cover the spectral lines of the sample to be analyzed for simultaneously exciting resonance of different resonant spectral lines, if any, at different resonant frequencies to produce a transient composite resonance signal after each pulse of applied first radio frequency signal, means for applying a second radio frequency signal to said probe for exciting the reference sample to resonance, means for storing discrete time displaced components of each of the transient composite resonance signals after each pulse of applied first radio frequency signal in a time averaging computer, means for detecting a resonance signal of the excited reference sample, and means for utilizing the detected resonance signal of the reference sample for maintaining a constant relationship between the first radio frequency signal and the intensity of the magnetic field.

12. A resonance apparatus as in claim 11, wherein said time averaging computer comprises a core memory matrix having a plurality of data channels, and wherein means are provided for storing the unknown sample resonance signal serially in successive channels of said matrix.

13. A resonance apparatus as in claim 11, wherein the detected resonance signal of the unknown sample is the absorption mode signal, and the detected resonance signal of the reference sample is the dispersion mode signal.

14. A resonance apparatus as in claim 11, wherein the unknown sample is a proton sample, and the reference sample includes fluorine; and means are provided for maintaining the ratio of the first frequency to the magnetic field intensity substantially constant relative to the ratio of the second frequency to the same magnetic field intensity.

15. A resonance apparatus as in claim 11, wherein the reference sample is a fluorine compound, which is resonant at substantially 56.4 megacycles and the first frequency signal applied to the unknown sample is substantially 60 megacycles.

References Cited

UNITED STATES PATENTS

| | | | |
|---|---|---|---|
| 3,256,478 | 6/1966 | Dehmelt | 324—0.5 |
| 3,287,629 | 11/1966 | Varian | 324—0.5 |
| 3,297,860 | 1/1967 | Weiss | 324—0.5 |
| 3,328,686 | 6/1966 | Fuchs | 324—77 |
| 3,358,222 | 12/1967 | Hyde | 324—0.5 |

OTHER REFERENCES

The Review of Scientific Instruments, vol. 33, No. 11, November 1962, pp. 1160–1166 (Anderson).

RUDOLPH V. ROLINEC, Primary Examiner

MICHAEL J. LYNCH, Assistant Examiner